United States Patent [19]

Powers

[11] 4,073,711

[45] Feb. 14, 1978

[54] METHOD OF PRODUCING LITHIATED BETA-ALUMINA ARTICLES

[75] Inventor: Robert W. Powers, Schenectady, N.Y.

[73] Assignee: General Electric Company, Schenectady, N.Y.

[21] Appl. No.: 743,633

[22] Filed: Nov. 22, 1976

[51] Int. Cl.$^2$ .......................... C25D 1/14; C25D 1/20
[52] U.S. Cl. ................................................. 204/181 F
[58] Field of Search ........................ 204/181; 429/193

[56] References Cited

U.S. PATENT DOCUMENTS

| | | | |
|---|---|---|---|
| 3,719,531 | 3/1973 | Dzieciuch | 429/193 |
| 3,900,381 | 8/1975 | Powers | 204/181 |

*Primary Examiner*—Howard S. Williams
*Attorney, Agent, or Firm*—Paul R. Webb, II; Joseph T. Cohen; Jerome C. Squillaro

[57] ABSTRACT

A method of producing lithiated beta-alumina articles includes electrophoretically codepositing such material onto a mandrel from two powders, drying the deposited material, and sintering the dried material. Such articles are useful as containers for sodium and as solid electrolytes in sodium-sulfur and sodium halogen batteries.

4 Claims, No Drawings

METHOD OF PRODUCING LITHIATED BETA-ALUMINA ARTICLES

The present invention relates generally to a method of producing ionically conductive ceramics and is more particularly concerned with an improved method of producing lithiated beta-alumina articles having good electrical and structural characteristics.

Beta-alumina articles are useful as solid electrolytes in electrical energy storage devices in a variety of combinations of electrode materials useful over a broad range of operating temperature conditions. For example, a high-energy battery can employ an anode of sodium and a cathode of sulfur in which both the sodium and sulfur are in the molten state at operating temperature and are in contact with and separated by an electrolyte of a thin, plate-like article or of a closed end tube of sodium beta-alumina.

The term beta-alumina as used in the present invention includes beta-alumina, beta"-alumina, mixtures thereof, and related compounds.

In U.S. Pat. No. 3,719,531 — Dzieciuch et al entitled "Cationically-Conductive Ceramics, Their Preparation and Use," there is described sodium beta-alumina with a small weight percent of lithia which material is produced by isotatic pressing and sintering.

In U.S. Pat. No. 3,900,381, there is described a method of forming beta-alumina articles which includes electrophoretically depositing such material on a mandrel, drying the deposited material, and sintering the dried material.

In U.S. Pat. No. 3,896,018, there is described a method of forming beta-alumina articles which includes further adding a small weight percent of aluminum stearate to the specific suspension.

In U.S. Pat. No. 3,881,661, there is described a method of preparing an electrophoretic suspension of beta-alumina particles including vibromilling water free beta-alumina particles of a diameter larger than 20 microns in an organic fluid having a dielectric constant at 25° C of from 12 to 24 with zirconia grinding media. The resulting suspension is useful for forming beta-alumina articles by electrophoretic deposition.

In U.S. Pat. No. 3,896,019, there is described a method of forming beta-alumina articles which includes sintering beta-alumina greenware between 1650° and 1825° C in a preheated oxygen oxidizing atmosphere at a controlled passage rate from one-half to four inches per minute.

In U.S. Pat. No. 3,976,554, there is described a method of forming a beta-alumina article which includes electrophoretically depositing such material on a mandrel, exposing the deposited material promptly to a continuous flow of warm air thereby drying the deposited material, and sintering the dried material.

In U.S. Pat. No. 3,972,480, there is described a method of preparing a suspension of additive free beta-alumina particles which includes vibromilling water free beta-alumina particles with beta-alumina grinding media.

The above patents other than the one to Dzieciuch et al are assigned to the same assignee as the present application.

Two ceramic compositions have been reported in reports to the National Science Foundation. One composition is beta-alumina with a high lithia content which comprises 8.7% $Na_2O$, 0.7% $Li_2O$ and the balance $Al_2O_3$. This beta-alumina is fabricated by a method including hydrostatic pressing and conventional batch sintering. This composition is reported to contain large grains up to 150 microns in size, strengths of 12–15 kpsi and resistivity of 3–6 ohm centimeter at 300° C. The second composition is a beta-alumina composition with a low lithia content which contains 9.25% $Na_2O$, 0.25% $Li_2O$ and the balance $Al_2O_3$. This material, which was fabricated in a similar manner, was reported to have grains in the range of 12–15 microns, strengths of 30–36 kpsi, and specific resistivities of 12–15 ohm centimeter at 300° C. The first material contains practically all beta"-alumina. The second material contains in addition to beta"-alumina, beta-alumina and apparently $NaAlO_2$.

The primary object of my invention is to provide an improved method which results in the simplified and reproducible production of fine grain, lithiated beta-alumina articles with higher electrical conductivity than beta-alumina without lithia.

In accordance with one aspect of my invention, a method of producing lithiated beta-alumina articles includes providing a suspension of beta-alumina particles and soda-alumina particles, providing lithia in one or both of the types of particles, the majority of the particles having a diameter in the range of 1 to 2 microns in an organic liquid, electrophoretically codepositing the particles from the two powders in the same vehicle onto a mandrel, drying the deposited material, removing the deposit from the mandrel, and sintering the dried material to produce a dense, sintered article containing from 0.1 to 1.0 weight percent lithia.

These and various other objects, features and advantages of the invention will be better understood from the following description:

I found that I could produce dense, fine-grain sintered lithiated beta articles containing from 0.1 to 1.0 weight percent lithia. The lithia is introduced into one or both of the powders employed in the electrophoretic codeposition. The soda alumina particles have a soda content from 14 to 30 weight percent.

I found unexpectedly that I could produce lithiated beta-alumina articles by electrophoretic codeposition of such material onto a mandrel from two powders, drying the deposited material, and sintering the dried material. I had previously electrophoretically deposited beta-alumina by deposition from a single powder as described in U.S. Pat. Nos. 3,900,381: 3,972,480: 3,896,018: and 3,976,554. I attempted repeatedly to electrophoretically deposit a single powder with a higher lithia composition of 8.7% $Na_2O$, 0.7% $Li_2O$ and the balance $Al_2O_3$ as described above. The single powder was prepared by tumble mixing together Alcoa ground XB-2 beta-alumina powder containing approximately 7.3% $Na_2O$ and the balance $Al_2O_3$ with appropriate quantities of lithium oxalate and anhydrous sodium carbonate powders and calcining at 1100° C. Suspension of the single powder in n-amyl alcohol were prepared by vibratory milling as described in U.S. Pat. No. 3,972,480. Deposition was attempted as described in U.S. Pat. Nos. 3,900,381 and 3,896,018. No electrophoretic deposits were obtained.

I found unexpectedly that I could produce lithiated beta-alumina articles by electrophoretic codeposition of such material onto a mandrel from two powders, drying the deposited material, and sintering the dried material. A single powder with a lower lithia composition of 9.25% $Na_2O$, 0.25% $Li_2O$ and the balance of $Al_2O_3$ could be electrophoretically deposited as above described. The results, however, were not as reproducible and the deposit masses were not as large as in my present codeposition method.

I found that I could produce beta-alumina articles with a higher lithia content by electrophoretic codeposition of such a material onto a mandrel from a suspension containing beta-alumina particles and soda-alumina particles in which lithia was contained in one of the types of particles, drying the deposited material, and sintering the dried powder. When the lithia is contained in the beta-alumina particles, the low soda powder, the lithiated beta-alumina particles can be prepared by tumble mixing Alcoa ground XB-2 beta-alumina powder with lithium oxalate and calcining at 1100° C. The soda-alumina particles, the high soda powder, can have the composition, 0.30 $Na_2O.0.70\ Al_2O_3$, approximately 20.7% $Na_2O$ by weight. The soda-alumina particles can be prepared by tumble mixing ground Alcoa XB-2 beta-alumina powder with anhydrous sodium carbonate, followed by calcination at 1100° C. Appropriate powder quantities of the lithiated beta-alumina particles and the soda-alumina particles, having an overall composition corresponding to 8.7% $Na_2O$, 0.7% $Li_2O$ and the balance $Al_2O_3$, of the above reported compositions, are placed in a suspension in n-amyl alcohol, vibratory milled, and codeposited electrophoretically without difficulty. The preparation of the suspension is described in detail in above mentioned U.S. Pat. Nos. 3,900,381; 3,896,018; and 3,972,480. Codeposition was carried out as described for the deposition in above-mentioned U.S. Pat. Nos. 3,900,381 and 3,896,018.

I found that I could produce beta-alumina articles with a lower lithia content by electrophoretic codeposition of such a material onto a mandrel from a suspension containing beta-alumina particles and soda-alumina particles in which lithia was contained in one of the type of particles, drying the deposited material, and sintering the dried powder. When the lithia is contained in the beta-alumina particles, the low soda powder, the lithiated beta-alumina particles can be prepared by tumble mixing Alcoa ground XB-2 beta-alumina powder with lithium oxalate and calcining at 1100° C. The soda-alumina particles, the high soda powder, can have the composition, 0.30 $Na_2O.0.70\ Al_2O_3$, approximately 20.7 percent $Na_2O$ by weight. The soda-alumina particles are prepared by tumble mixing ground Alcoa XB-2 beta-alumina powder with anhydrous sodium carbonate, followed by calcination at 1100° C. Appropriate powder quantities of the lithiated beta-alumina particles and the soda-alumina particles, having an overall composition corresponding to 9.25% $Na_2O$, 0.25% $Li_2O$ and the balance $Al_2O_3$, one of the above reported compositions are placed in a suspension in n-amyl alcohol, vibratory milled, and codeposited electrophoretically. The resulting articles had larger deposit masses and were more reproducible. The preparation of the suspension is described in detail in above-mentioned U.S. Pat. Nos. 3,900,381: 3,896,018: and 3,972,480. Codeposition was carried out as described for the deposition in above-mentioned U.S. Pat. Nos. 3,900,381 and 3,896,018.

Examples of producing beta-alumina articles are as follows: Examples 1-5, 11-15, 21-25 and 31-35 were not made in accordance with the method of my present invention, while Examples 6-10, 16-20, 26-30, and 36-40 were made in accordance with the method of this invention.

EXAMPLES 1-5

Five suspensions were prepared which are identified as Examples 1-5. The single powder for the suspension was prepared by tumble mixing together 147.5 grams of Alcoa ground XB-2 beta-alumina powder having a composition of approximately 7.2% $Na_2O$, and the balance $Al_2O_3$ with 3.65 grams of lithium oxalate powder and 4.27 grams of anhydrous sodium carbonate powder to provide a higher lithia composition of 8.7% $Na_2O$, 0.7% $Li_2O$ and the balance $Al_2O_3$. These powders were calcined at 1100° C to form a single powder. Each suspension contained 150 grams of the single powder with an aggregate particle size of about 40 microns and 300 cubic centimeters of n-amyl alcohol. Each suspension was vibromilled for 24 hours. After the resulting powder particles in each suspension had the grinding media removed therefrom, it was attempted to electrophoretically deposit the powder on mandrels. The particles after grinding had a majority thereof with a diameter of 1 to 2 microns. No electrophoretic deposits were obtained.

EXAMPLES 6-10

Five suspensions were prepared which were identified as Examples 6-10. Two powders were prepared for the suspensions. One powder was lithiated Alcoa XB-2 beta alumina. It was prepared initially by tumble mixing 131.7 grams of Alcoa ground XB-2 beta-alumina powder with 3.64 grams lithium oxalate powder and calcining at 1100° C. The second powder was sodium alumina which had the composition of 0.30 $Na_2O.0.70\ Al_2O_3$ which is approximately 20.7 weight percent $Na_2O$. The second powder was prepared by tumble mixing 200 grams of ground XB-2 beta-alumina powder with 57.9 grams of anhydrous sodium carbonate powder which was followed by calcination at 1100° C. Each suspension contained 132.8 grams of lithiated beta-alumina, 17.2 grams of soda alumina powder, and 300 cubic centimeters of n-amyl alcohol. The compositions of the two powders corresponded to a higher lithia composition of 8.7% $Na_2O$, 0.7% $Li_2O$, and the balance $Al_2O_3$. Each suspension employed 900 grams of beta-alumina grinding media. Each suspension was vibratory milled for 24 hours. Some of the resulting powder particles in each suspension after removal of the grinding media were electrophoretically codeposited on mandrels to provide five deposits and subsequently five articles from each suspension. The resulting articles had a majority of the particles with the size in the range of from 1 to 2 microns. Each deposit on its respective mandrel was kept in a dried nitrogen chamber until dried by dehumidifier discharge as described in U.S. Pat. No. 3,976,554. The deposit in the form of the tube was then removed by hand. Each tube was sintered subsequently in a preheated oxygen oxidizing atmosphere furnace at a traverse rate of 0.5 inches per minute as described in U.S. Pat. No. 3,896,019. Sintering temperatures betwen 1575° and 1675° C were used. Each resulting tube was a beta-alumina article made in accordance with my present invention.

EXAMPLES 11-15

Five suspensions were prepared which were identified as Examples 11-15. The single powder was prepared by tumble mixing together 151 grams of Alcoa ground XB 2 alumina powder with a composition of 8% $Na_2O$ and the balance $Al_2O_3$ with 1.30 grams of lithium oxalate powder and 5.47 grams of anhydrous sodium carbonate powder to provide a lower lithia composition of 9.8% $Na_2O$, 0.25% $Li_2O$ and the balance $Al_2O_3$. These powders were calcined at 1100° C to form a single powder. Each suspension contained 154 grams of single powder with an aggregate powder size of about 40 microns and 300 cubic centimeters of n-amyl alcohol. Each suspension employed 900 grams of beta-alumina grinding media. Each suspension was vibromilled for 24 hours. Some of the resulting powder particles in each suspension after removal of the grinding media were electrophoretically deposited on mandrels to provide a deposit and subsequently an article from each suspension. Each deposit on its respective mandrel was kept in a nitrogen chamber until dried by dehumidifier discharge as described in U.S. Pat. No. 3,976,554. The deposit in the form of a tube was then easily removed by hand. Each deposit was sintered subsequently in a preheated oxygen oxidizing atmosphere furnace at a traverse rate of 0.5 inches per minute as described in U.S. Pat. No. 3,896,019. Sintering temperatures between 1625° and 1675° C were used. Each resulting device was a beta-alumina article not made in accordance with my present invention.

EXAMPLES 16-20

Five suspensions were prepared which were identified as Examples 16-20. Two powders were prepared for the suspensions. One powder was lithiated Alcoa XB-2 beta-alumina. It was prepared initially by tumble mixing 690.5 grams of Alcoa ground XB-2 beta-alumina powder with 6.9 grams lithium oxalate powder and calcining at 1100° C. The second powder was soda alumina which had the composition of 0.30 $Na_2O.0.70$ $Al_2O_3$ which is approximately 20.7 weight percent $Na_2O$. The second powder was prepared by tumble mixing 202.7 grams of ground XB-2 beta-alumina powder with 57.9 grams of anhydrous sodium carbonate powder which was followed by calcination at 1100° C. Each suspension contained 130.5 grams of lithiated beta-alumina, 22.4 grams of soda alumina powder, and 300 cubic centimeters of n-amyl alcohol. The compositions of the two powders corresponded to a lower lithia composition of 9.8% $Na_2O$, 0.25% $Li_2O$, and the balance $Al_2O_3$. Each suspension employed 900 grams of beta-alumina grinding media. Each suspension was vibratory milled for 24 hours. Some of the resulting powder particles in each suspension after removal of the grinding media were electrophoretically codeposited on mandrels to provide a deposit and subsequently an article from each suspension. The resulting particles had a majority of the particles with the size in the range of from 1 to 2 microns. Each deposit on its respective mandrel was kept in a dried nitrogen chamber until dried by dehumidifier discharge as described in U.S. Pat. No. 3,976,554. The deposit in the form of the tube was then removed by hand. Each tube was sintered subsequently in a preheated oxygen oxidizing atmosphere furnace at a traverse rate of 0.5 inches per minute as described in U.S. Pat. No. 3,896,019. Sintering temperatures between 1625° and 1725° C were used. Each resulting tube was a beta-alumina article made in accordance with my invention.

EXAMPLES 21-25

Five suspensions were prepared as described above in Examples 11-15 which are identified as Examples 21-25. One deposit and subsequent article were produced from each suspension. The conditions were the same as in the above Examples 11-15. The Examples are set forth below with the weight or mass of each deposit.

| Example No. | Weight or Mass of Deposit-Grams |
|---|---|
| 21 | 4.1 |
| 22 | 4.4 |
| 23 | 3.8 |
| 24 | 3.8 |
| 25 | 3.7 |

The average weight or deposit mass, expressed as $m$, was 3.96 grams. The standard deviation, expressed as $s$, was 0.29 grams. The standard deviation, expressed a fraction of the average deposit mass, was 0.073. These articles were beta-alumina articles produced by deposition from a single powder which was not in accordance with my invention.

EXAMPLES 26-30

Five suspensions were prepared as described above in Examples 16-20 which are identified as Examples 26-30. One codeposit and subsequent article were produced from each suspension. The conditions were the same as in the above Examples 16-20. The Examples are set forth below with the weight or mass of each deposit.

| Example No. | Weight or Mass of Deposit-Grams |
|---|---|
| 26 | 8.2 |
| 27 | 8.6 |
| 28 | 8.2 |
| 29 | 8.1 |
| 30 | 8.1 |

The average weight or deposit mass, expressed as $m$, was 8.24 grams. The standard deviation, expressed as $s$, was 0.21 grams. The standard deviation, expressed as a fraction of the average deposit mass, was 0.025. These articles were beta-alumina articles produced by codeposition from two powders which was in accordance with my invention.

It will be seen that the average deposit mass of Examples 26-30 was about twice as great as the average deposit mass of Examples 21-25. Further, the standard deviation, expressed as a fraction of the average deposit mass, was only a third with Examples 26-30 as opposed to Examples 21-25.

EXAMPLES 31-35

A suspension was prepared substantially as above for Examples 11-15. Five deposits and subsequently five articles were produced from this suspension. These are identified as Examples 31-35. The condition were the same as in the above Examples 11-15 except that sintering temperatures between 1575° and 1675° C were used. The examples are set forth with sintering temperature and density in grams per cubic centimeter. These beta-alumina articles produced by deposition from a single powder were not in accordance with my present invention.

| Example No. | Sintering Temperature Degrees C | Density g/cc |
|---|---|---|
| 31 | 1575 | 3.122 |

-continued

| Example No. | Sintering Temperature Degrees C | Density g/cc |
|---|---|---|
| 32 | 1600 | 3.248 |
| 33 | 1625 | 3.257 |
| 34 | 1650 | 3.266 |
| 35 | 1675 | 3.277 |

EXAMPLES 36–40

A suspension was prepared substantially as above in Examples 16–20. Five deposits and subsequently five articles were produced from this suspension. The conditions were the same as in the above Examples 16–20 except that sintering temperatures between 1575° and 1675° C were used. The examples are set forth with sintering temperature and density in grams per cubic centimeter. These beta-alumina articles produced by codeposition from two powders were in accordance with my present invention.

| Example No. | Sintering Temperature Degrees C | Density g/cc |
|---|---|---|
| 36 | 1575 | 3.104 |
| 37 | 1600 | 3.238 |
| 38 | 1625 | 3.246 |
| 39 | 1650 | 3.254 |
| 40 | 1675 | 3.271 |

It will be noted that the deposits in both Examples 31–35 and 36–40 sinter at very nearly the same rate.

EXAMPLES 41–46

Two suspensions were prepared which resulted in three tubes from each suspension for a total of six tubes on which density measurements were taken. These were identified as Examples 41–46. Two powders were prepared for each suspension. One powder was lithiated Alcoa XB-2 beta-alumina, a low soda powder with about 8.0 weight percent soda. It was prepared initially by tumble mixing 690.5 grams of Alcoa ground XB-2 beta-alumina powder with 6.9 grams of lithium oxalate powder and calcining at 1100° C. The second powder was soda alumina, a high soda powder, which had the composition of 0.3 $Na_2O \cdot 0.7\ Al_2O_3$. The second powder was prepared by tumble mixing 202.7 grams of ground XB-2 beta-alumina powder with 57.9 grams of anhydrous sodium carbonate powder which was followed by calcination at 1100° C. Each suspension contained 130.5 grams of lithiated beta-alumina, 22.4 grams of soda alumina powder, and 300 cubic centimeters of n-amyl alcohol. The compositions of the two powders corresponded to a lower lithia composition of 9.8% $Na_2O$, 0.25% $Li_2O$, and the balance $Al_2O_3$. Each suspension employed 900 grams of beta-alumina grinding media. Each suspension was vibratory milled for 24 hours. The resulting powder particles in each suspension after removal of the grinding media were electrophoretically codeposited on mandrels to provide three deposits and subsequently three articles from each suspension. The resulting articles had a majority of the particles with the size in the range of from 1 to 2 microns. Each deposit on its respective mandrel was kept in a dried nitrogen chamber until dried by dehumidifier discharge as described in U.S. Pat. No. 3,976,554. The deposit in the form of the tube was then removed by hand. Each tube was sintered subsequently in a preheated oxygen oxidizing atmosphere furnace at a traverse rate of 0.5 inches per minute at a temperature of 1675° C as described in U.S. Pat. No. 3,896,019. Each resulting tube was a beta-alumina article made in accordance with my present invention.

The table below shows the mass in grams of the first tube from each suspension, the average sintered density in grams per cubic centimeter of each group of three tubes, and the standard deviation in sintered density in grams per cubic centimeter of each group of three tubes.

| Example Nos. | Mass of First Tube | Sintered Density Average Std. Deviation |
|---|---|---|
| 41–43 | 9.7 grams | 3.268 g/cc 0.0006 g/cc |
| 44–46 | 9.3 grams | 3.275 g/cc 0.0030 g/cc |

EXAMPLES 47–52

Two suspensions were prepared which resulted in three tubes from each suspension for a total of six tubes on which density measurements were taken. These were identified as Examples 47–52. Two powders were prepared for each suspension. One powder was Alcoa XB-2 beta-alumina, a low soda powder with about 8.0 weight percent soda. The second powder was lithiated soda alumina which had the composition of 0.3 $Na_2O \cdot 0.7\ Al_2O_3 \cdot 0.05\ Li_2O$. The second powder was prepared by tumble mixing 202.7 grams of ground XB-2 beta-alumina powder with 57.9 grams of anhydrous sodium carbonate powder, and with 13.9 grams of lithium oxalate which was followed by calcination at 1100° C. Each suspension contained 129.2 grams of beta-alumina, 22.8 grams of lithiated soda alumina powder, and 300 cubic centimeters of n-amyl alcohol. The compositions of the two powders corresponded to a lower lithia composition of 9.8% $Na_2O$, 0.25% $Li_2O$, and the balance $Al_2O_3$. Each suspension employed 900 grams of beta-alumina grinding media. Each suspension was vibratory milled for 24 hours. The resulting powder particles in each suspension after removal of the grinding media were electrophoretically codeposited on mandrels to provide three deposits and subsequently three articles from each suspension for density measurements. The resulting particles had a majority of the particles with the size in the range of from 1 to 2 microns. Each deposit on its respective mandrel was kept in a dried nitrogen chamber until dried by dehumidifier discharge as described in U.S. Pat. No. 3,976,554. The deposit in the form of the tube was then removed by hand. Each tube was sintered subsequently in a preheated oxygen oxidizing atmosphere furnace at a traverse rate of 0.5 inches per minute at a temperature of 1672° C as described in U.S. Pat. No. 3,896,019. Each resulting tube was a beta-alumina article made in accordance with my present invention.

The table below shows the mass in grams of the first tube from each suspension, the average sintered density in grams per cubic centimeter of each group of three tubes, and the standard deviation in sintered density in grams per cubic centimeter of each group of five tubes.

| Example Nos. | Mass of First Tube | Sintered Density Average Std. Deviation |
|---|---|---|
| 47–49 | 10.1 grams | 3.268 g/cc 0.0015 g/cc |
| 50–52 | 9.8 grams | 3.270 g/cc 0.000 g/cc |

Examples 41–52 demonstrate that lithia can be placed in the higher soda powder as well as the lower soda one without affecting substantially either the deposit mass or the density after sintering.

EXAMPLES 53–55

Three suspensions were prepared from which tubes were electrophoretically deposited. The first tube deposited from each suspension is used as an example. They are identified as Examples 53–55. Two powders were prepared for each suspension. One powder was XB-2 beta-alumina, a low soda powder with about 8.0 weight percent soda. The second powder, lithiated soda alumina, had various composition. That for Example 53 contained 25 weight percent soda, which is approximately the composition of the soda-alumina eutectic. That for Example 54 contained 20.7 percent soda while that for Example 55 contained 14.2 percent soda. These high soda powders were prepared by tumble mixing appropriate quantities of ground Alcoa XB-2 beta-alumina powder, with sodium carbonate and lithium oxalate. This was followed by calcination at 1100° C. Suspensions were prepared each containing 150 grams of the appropriate combination of Alcoa XB-2 beta-alumina powder and lithiated soda alumina as well as 300 cubic centimeters of n-amyl alcohol. The compositions of the two powders correspond to a lower lithia composition of 9.6% $Na_2O$, 0.25% $Li_2O$, and the balance $Al_2O_3$. Each suspension employed 900 grams of beta-alumina grinding media. Each suspension was vibratory milled for 24 hours. The resulting powder particles in each suspension after removal of the grinding media were electrophoretically codeposited on mandrels. The deposition conditions for each suspension were identical. The resulting articles had a majority of the particles with the size in the range of from 1 to 2 microns. Each deposit on its respective mandrel was kept in a dried nitrogen chamber until dried by dehumidifier discharge as described in U.S. Pat. No. 3,976,554. The deposit in the form of the tube was then removed by hand. Each tube was sintered subsequently in a preheated oxygen oxidizing atmosphere furnace at a traverse rate of 0.5 inches per minute at a temperature of 1675° C as described in U.S. Pat. No. 3,896,019. The first tube deposited and processed as described immediately above is used as an example of a beta-alumina article made in accordance with the invention.

The mass in grams was determined for the first tube from each suspension. The first tubes correspond to Examples 53, 54 and 55. The mass of tube 53 was 9.5 grams. The mass of tube 54 was 9.5 grams. The mass of tube 55 was 9.0 grams. These examples showed that the composition of the high soda powder could be varied with only slight changes in the deposit masses of ware corresponding to a lower lithia composition.

EXAMPLES 56–58

Three suspensions were prepared from which tubes were electrophoretically deposited. The first tube deposited from each suspension is used as an example. They are identified as Examples 56–58. Two powders were prepared for each suspension. One powder was Alcoa XB-2 beta-alumina, a low soda powder with about 8.0 percent soda. The second powder, lithiated soda alumina, had various compositions. That for Examples 56 contained 25 weight percent soda, which is approximately the composition of the soda-alumina eutectic. That for Example 57 contained 20.7 percent soda while that for Example 58 contained 14.2 percent soda. These high soda powders were prepared by tumble mixing appropriate quantities of ground Alcoa XB-2 beta alumina powder with sodium carbonate and lithium oxalate. This was followed by calcinating at 1100° C. Suspensions were prepared each containing 150 grams of the appropriate combination of Alcoa XB-2 beta-alumina and lithiated soda alumina as well as 300 cubic centimeters of n-amyl alcohol. The compositions of the two powders corresponded to a higher lithia composition of 9.6% $Na_2O$, 0.75% $Li_2O$, and the balance $Al_2O_3$. Each suspension employed 900 grams of beta-alumina grinding media. Each suspension was vibratory milled for 24 hours. The resulting powder particles in each suspension after removal of the grinding media were electrophoretically codeposited on mandrels. The deposition conditions for each suspension were identical. The resulting articles had a majority of the particles with the size in the range of from 1 to 2 microns. Each deposit on its respective mandrel was kept in a dried nitrogen chamber until dried by dehumidifier discharge as described in U.S. Pat. No. 3,976,554. The deposit in the form of the tube was then removed by hand. Each tube was sintered subsequently in a preheated oxygen oxidizing atmosphere furnace at a traverse rate of 0.5 inches per minute as described in U.S. Pat. No. 3,896,019. Sintering temperatures between 1675° and 1725° C were used. The first to be deposited from each suspension and process as described immediately above is used as an example of a beta-alumina article made in accordance with this invention.

The mass in grams was determined for the first tube from each suspension. The first tubes correspond to Examples 56, 57 and 58. The mass of tube 56 was 9.4 grams. The mass of tube 57 was 9.2 grams. The mass of tube 58 was 8.4 grams.

Examples 53–58 demonstrate that a wide range of soda concentrations can be used in the high soda powder in the electrodeposition of beta-alumina.

While other modifications of the invention and variations thereof which may be employed within the scope of the invention have not been described, the invention is intended to include such as may be embraced within the following claims.

What I claim as new and desire to secure by Letters Patent of the United States is:

1. A method of producing a lithiated beta-alumina article comprising providing a suspension of beta-alumina particles and soda alumina particles with a soda content from 14 to 30 weight percent, providing lithia in at least one of the types of particles, the majority of the particles having a diameter in the range of 1 to 2 microns in an organic liquid having a dielectric constant at 25° C from 12 to 24, electrophoretically codepositing the particles from the suspension as a dense deposit onto a charged electrode in a DC field of from 100 to 10,000 volts per centimeter, drying the deposit on the electrode, removing the deposit from the electrode, and sintering the deposit in an oxidizing atmosphere at a temperature between 1500° and 1775° C resulting in a dense, fine-grain sintered article containing from 0.1 to 1.0 weight percent lithia.

2. A method of forming an alumina article as in claim 1, in which the organic fluid is n-amyl alcohol having a dielectric constant of 13.9.

3. A method of forming an alumina article as in claim 1, in which the sintering article contains 0.25 weight percent lithia.

4. A method of forming an alumina article as in claim 1, in which the lithia is contained in both types of particles.

* * * * *